US010730427B2

(12) United States Patent
Tatara et al.

(10) Patent No.: US 10,730,427 B2
(45) Date of Patent: Aug. 4, 2020

(54) LIGHTING DEVICE

(71) Applicant: KOITO MANUFACTURING CO., LTD., Tokyo (JP)

(72) Inventors: Naoki Tatara, Shizuoka (JP); Toshihiro Okamura, Shizuoka (JP); Takeshi Masuda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/474,794

(22) PCT Filed: Nov. 30, 2017

(86) PCT No.: PCT/JP2017/043096
§ 371 (c)(1),
(2) Date: Jun. 28, 2019

(87) PCT Pub. No.: WO2018/123429
PCT Pub. Date: Jul. 5, 2018

(65) Prior Publication Data
US 2019/0322207 A1 Oct. 24, 2019

(30) Foreign Application Priority Data
Dec. 28, 2016 (JP) .................. 2016-256291

(51) Int. Cl.
*B60Q 1/00* (2006.01)
*F21S 41/675* (2018.01)
(Continued)

(52) U.S. Cl.
CPC .......... *B60Q 1/0023* (2013.01); *B60Q 1/06* (2013.01); *B60Q 1/14* (2013.01); *F21S 41/675* (2018.01);
(Continued)

(58) Field of Classification Search
CPC .......... B60Q 1/0023; B60Q 1/06; B60Q 1/14; F21S 41/675
(Continued)

(56) References Cited

U.S. PATENT DOCUMENTS 4,985,816 A * 1/1991 Seko .................... B60Q 1/0023
362/303
5,588,733 A * 12/1996 Gotou ...................... B60Q 1/12
315/79
(Continued)

FOREIGN PATENT DOCUMENTS

DE 102007028658 A1 12/2008
DE 102014113478 A1 3/2016
(Continued)

OTHER PUBLICATIONS

International Search Report issued in Application No. PCT/JP2017/043096, dated Feb. 27, 2018 (5 pages).
(Continued)

Primary Examiner — Bryon T Gyllstrom
(74) Attorney, Agent, or Firm — Osha Liang LLP

(57) ABSTRACT

An illumination apparatus has a light source unit that can form a light distribution pattern by applying light into a virtual region, and an illuminance controller that can change the illuminance of at least a part of the light distribution pattern. The illuminance controller reduces the illuminance of the light distribution pattern in a region positioned in a first center in the vertical direction and a second center in a lateral direction, depending on a signal transmitted from an oncoming vehicle detector that transmits a signal according to the presence of an oncoming vehicle.

5 Claims, 13 Drawing Sheets

(51) Int. Cl.
*B60Q 1/06* (2006.01)
*B60Q 1/14* (2006.01)
*G05D 1/02* (2020.01)

(52) U.S. Cl.
CPC ......... *B60Q 2300/42* (2013.01); *G05D 1/021* (2013.01)

(58) Field of Classification Search
USPC ...................................................... 362/466
See application file for complete search history.

(56) References Cited

U.S. PATENT DOCUMENTS

| | | | | |
|---|---|---|---|---|
| 6,578,993 | B2* | 6/2003 | Kobayashi | B60Q 1/12 315/79 |
| 7,429,918 | B2* | 9/2008 | Watanabe | B60Q 1/085 340/468 |
| 2002/0080618 | A1* | 6/2002 | Kobayashi | B60Q 1/085 362/466 |
| 2005/0036660 | A1* | 2/2005 | Otsuka | B60Q 1/1423 382/104 |
| 2009/0190323 | A1* | 7/2009 | Watanabe | B60Q 1/143 362/37 |
| 2010/0033978 | A1* | 2/2010 | Ehm | B60Q 1/085 362/465 |
| 2013/0272013 | A1* | 10/2013 | Tatara | B60Q 1/0023 362/546 |
| 2015/0055357 | A1* | 2/2015 | Nakatani | F21S 41/143 362/466 |
| 2016/0161077 | A1* | 6/2016 | Albou | B60Q 1/143 362/509 |
| 2016/0185276 | A1* | 6/2016 | Tanaka | B60Q 1/085 362/466 |
| 2016/0250964 | A1* | 9/2016 | Takagaki | B60Q 1/08 362/466 |

FOREIGN PATENT DOCUMENTS

| | | |
|---|---|---|
| EP | 2275305 A1 | 1/2011 |
| EP | 2415636 A2 | 2/2012 |
| EP | 2957464 A1 | 12/2015 |
| JP | H09-277887 A | 10/1997 |
| JP | 2013-154745 A | 8/2013 |
| JP | 2013-222611 A | 10/2013 |
| JP | 2014078476 A | 5/2014 |
| JP | 2016-215788 A | 12/2016 |
| WO | 2008/053521 A1 | 5/2008 |

OTHER PUBLICATIONS

Written Opinion issued in International Application No. PCT/JP2017/043096, dated Feb. 27, 2018 (4 pages).
Extended European Search Report issued in corresponding European Application No. 17889119.8, dated Jun. 9, 2020 (9 pages).

* cited by examiner

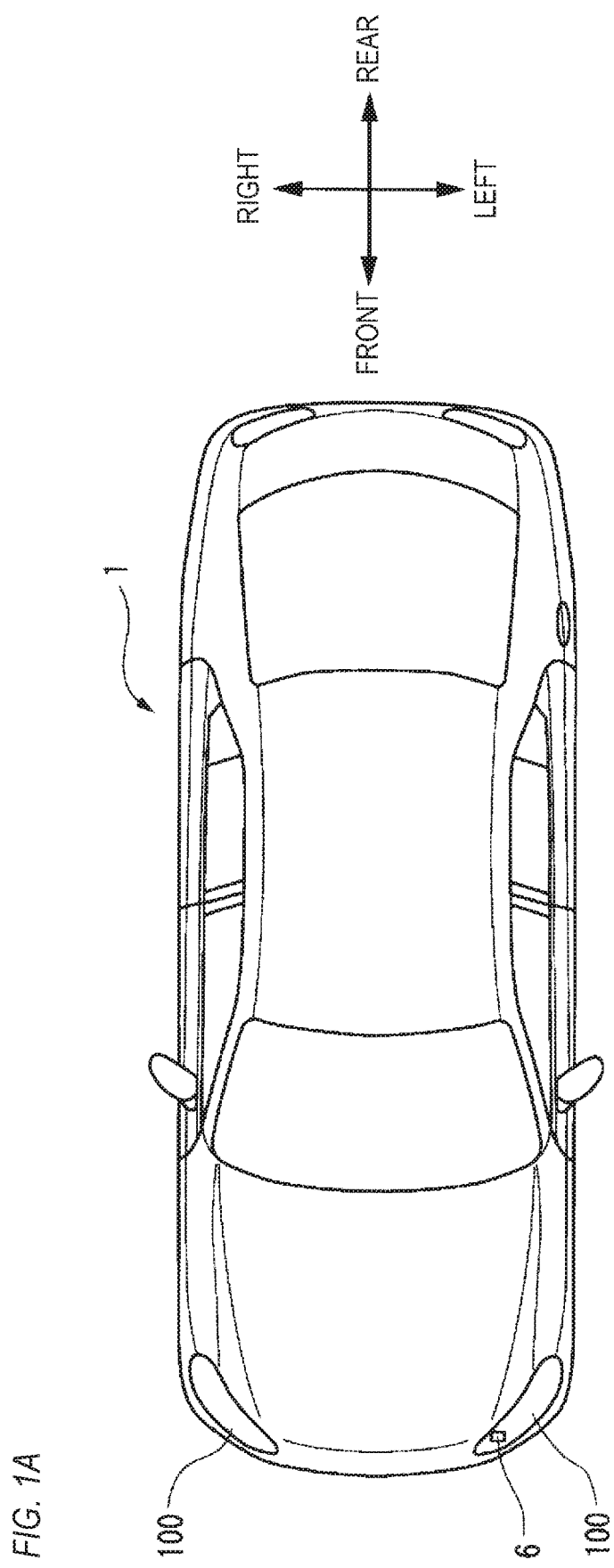

LIGHTING DEVICE

CROSS-REFERENCE TO RELATED APPLICATIONS

The present application is a national stage application of PCT/JP2017/043096 filed on Nov. 30, 2017, and claims priority to Japanese Patent Application No. 2016-256291 filed on Dec. 28, 2016, the contents of which are incorporated herein by reference in their entirety.

BACKGROUND

Technical Field

The present invention relates to a lighting device.

Related Art

Researches on automated driving techniques of automobiles have been actively conducted in various countries, and each country considers legislation to allow a vehicle to travel on public roads in an automated driving mode. Here, the automated driving mode refers to a mode in which the traveling of the vehicle is automatically controlled. On the other hand, a manual driving mode refers to a mode in which the traveling of the vehicle is controlled by a driver. In an automated driving vehicle, the traveling of the vehicle is automatically controlled by a computer.

Accordingly, it is expected in the future that a vehicle traveling in the automated driving mode (hereinafter referred to as an "automated driving vehicle") and a vehicle traveling in the manual driving mode (hereinafter referred to as a "manual driving vehicle") coexist on public roads.

Patent Document 1 discloses an automatic following travel system where a following vehicle automatically follows a preceding vehicle. In the automatic following travel system, each of the preceding vehicle and the following vehicle includes a display device, and character information for preventing another vehicle from interrupting between the preceding vehicle and the following vehicle is displayed on the display device of the preceding vehicle, and character information indicating that the vehicle is in the automatic following traveling is displayed on the display device of the following vehicle.

Patent Document 1: JP-A-H9-277887

SUMMARY OF INVENTION

The automated driving vehicle acquires information in front of the vehicle by a camera, and controls the vehicle according to the acquired information. When strong light from a headlight of an oncoming vehicle or the like incidents on the camera, halation occurs in the camera, making it difficult to efficiently acquire the information on the front of the vehicle.

One or more embodiments of the present invention provides a lighting device which hardly causes halation in a camera of another automated driving vehicle.

(1) According to one or more embodiments of the present invention, there is provided a lighting device mounted on a vehicle and configured to emit light toward a front of the vehicle, the lighting device including:

a light source unit capable of forming a light distribution pattern by emitting light toward a virtual region which expands in a rectangular shape at 15° to left and right and at 6° to upper and lower with respect to a reference line extending in a horizontal direction from a center position of the lighting device toward the front of the vehicle; and an illuminance control unit capable of changing the illuminance of at least a part of the light distribution pattern, wherein the illuminance control unit lowers the illuminance of a region located in a first central portion and a second central portion when the virtual region is equally divided into an upper portion, the first central portion, and an upper portion in an upper-lower direction and the virtual region is equally divided into a left portion, the second central portion, and a right portion in a left-right direction according to a signal transmitted from an oncoming vehicle detection unit which transmits the signal according to the presence of an oncoming vehicle.

According to the lighting device of one or more embodiments of the present invention, since the illuminance of the light emitted to the oncoming vehicle is lowered when the presence of an oncoming vehicle is detected, halation is hardly caused in the camera mounted on the other vehicle.

(2) In the lighting device according to one or more embodiments of the present invention, a lamp chamber is formed by a housing and an outer cover, and a camera capable of acquiring information in front of the vehicle and transmitting a signal according to the acquired information to the oncoming vehicle detection unit is provided in the lamp chamber together with the light source unit.

According to the lighting device of this configuration, since the lighting device includes the camera, the vehicle may not have a separate camera.

(3) In the lighting device according to one or more embodiments of the present invention, the light source unit is supported by an optical axis changing mechanism which turns an optical axis of the light source unit in the left-right direction, in a turning on state of the lighting device, when the signal transmitted from the oncoming vehicle detection unit when the presence of the oncoming vehicle is detected is not input to the illuminance control unit, the optical axis of the light source unit extends toward a center in front of the vehicle, and the light source unit emits light to form a high beam light distribution pattern, and in the turning on state of the lighting device, when the signal transmitted from the oncoming vehicle detection unit when the presence of the oncoming vehicle is detected is input to the illuminance control unit, by deviating the optical axis of the light source unit to at least one of the left and the right, the illuminance control unit lowers the illuminance of the region located in the first central portion and the second central portion in the virtual region and raises the illuminance of at least one of a region located in the first central portion and the left portion and a region located in the first central portion and the right portion.

According to the lighting device of this configuration, since the light emitted toward a region where the oncoming vehicle may be present is emitted toward a region where a pedestrian may be present, it is possible to make it easy for the pedestrian to see a driver/camera of an own vehicle while suppressing halation of the oncoming vehicle.

(4) In the lighting device according to one or more embodiments of the present invention, the light source unit is configured to form a first light distribution pattern and a second light distribution pattern, in the first light distribution pattern, a point having highest illuminance in the virtual region is located in the second central portion in a left-right direction, in the second light distribution pattern, in the virtual region, two points in descending order of illuminance are deviated rightward and leftward from the reference line in the left-right direction, and are located in the first central portion in the upper-lower direction, in the turning on state of the lighting device, when the signal transmitted from the oncoming vehicle detection unit when the presence of the oncoming vehicle is detected is not input to the illuminance control unit, the illumination control unit causes the light source unit to emit light so as to form the first light distribution pattern, and in the turning on state of the lighting device, when a signal transmitted from an oncoming vehicle detection unit which transmits the signal according to the presence of the oncoming vehicle is input, the illuminance control unit causes the light source unit to emit light so as to form the second light distribution pattern.

According to the lighting device of this configuration, when the oncoming vehicle is not present, since light having the highest illuminance illuminates a distant location, the visibility of the distant location is enhanced for the driver and the camera of the own vehicle. Further, when the oncoming vehicle is present, since the light having the highest illuminance illuminates a region deviated to the left and right from a center line where the oncoming vehicle is present, halation hardly occurs in the camera of the oncoming vehicle.

(5) In the lighting device according to one or more embodiments of the present invention, in the second light distribution pattern, two points in descending order of illuminance are located in the left portion and the right portion of the virtual region in the left-right direction.

The pedestrian close to the own vehicle in the front-rear direction is likely to be in the left and the right of the virtual vertical screen. Therefore, according to the lighting device of this configuration, since bright light is emitted toward the left portion and the right portion where the pedestrian is likely to be present, the pedestrian can be easily recognized by the camera.

(6) In the lighting device according to one or more embodiments of the present invention, in the second light distribution pattern, when the virtual region is equally divided into four in the left-right direction, the two points in descending order of illuminance are located in a left end region and a right end region.

According to the lighting device of this configuration, light having high illuminance is emitted toward the end portions in the left-right direction. The pedestrian close to the own vehicle may be present at the end portions in the left-right direction in the virtual region. Thus, it becomes easy to recognize the pedestrian close to the own vehicle.

According to one or more embodiments of the present invention, there is provided the lighting device which hardly causes halation in the camera of the other automated driving vehicle.

BRIEF DESCRIPTION OF THE DRAWINGS

FIG. 1A is a top view of a vehicle including a lighting device according to one or more embodiments of the present invention.

DETAILED DESCRIPTION OF EMBODIMENTS

Figure 1B:
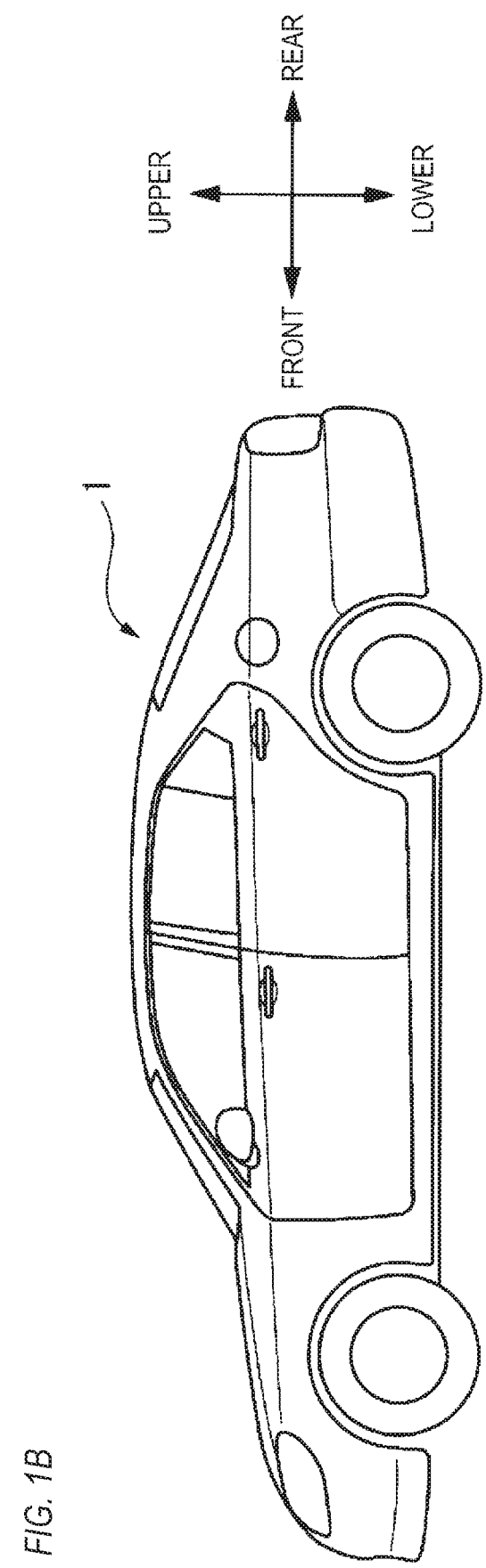
FIG. 1B is a side view of the vehicle shown in FIG. 1A.

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Incidentally, in the description of the embodiments, members having the same reference numerals as those already described are not described to simplify the description. The dimensions of the members shown in the drawings may be different from those of actual members for convenience of description.

In the description of the embodiments, a "left-right direction", a "front-rear direction", and an "upper-lower direction" are appropriately referred to for convenience of description. These directions are relative directions set for a vehicle 1 shown in FIGS. 1A and 1B. The "upper-lower direction" is a direction including an "upper direction" and a "lower direction". The "front-rear direction" is a direction including a "front direction" and a "rear direction". The "left-right direction" is a direction including a "left direction" and a "right direction".

First Embodiment

FIGS. 1A and 1B show a vehicle 1 mounted with a lighting device 100 according to a first embodiment. FIG. 1A shows a top view of the vehicle 1. FIG. 1B shows a side view of the vehicle 1. The vehicle 1 is an automobile capable of traveling in an automated driving mode and includes the lighting device 100. In the first embodiment, the lighting device 100 is a headlight provided in a front portion of the vehicle.

Figure 2:
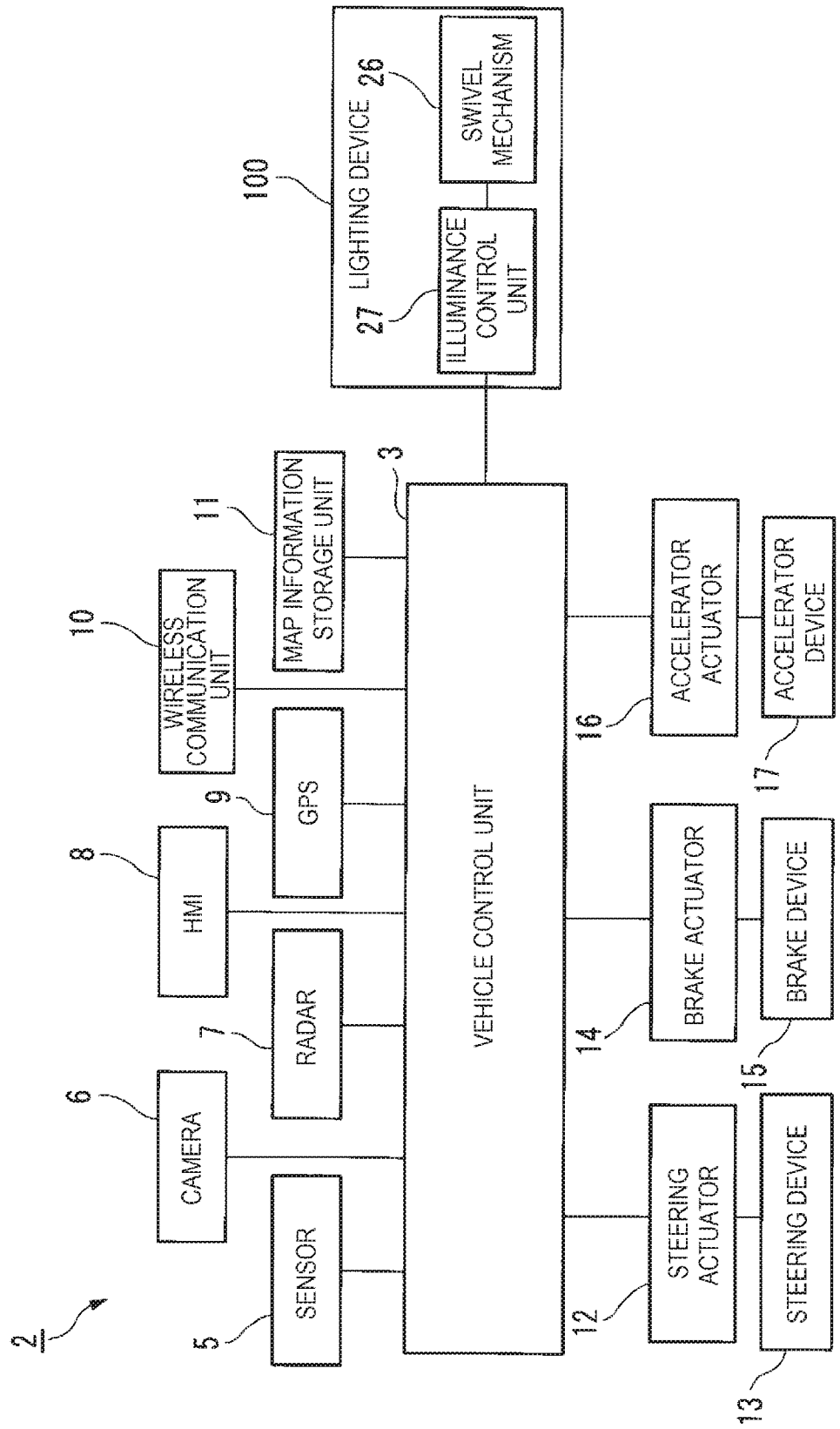
FIG. 2 is a block diagram of a vehicle system.

First, a vehicle system 2 of the vehicle 1 will be described with reference to FIG. 2. FIG. 2 shows a block diagram of the vehicle system 2. As shown in FIG. 2, the vehicle system 2 includes a vehicle control unit 3, a sensor 5, a camera 6, a radar 7, a Human Machine Interface (HMI) 8, a Global Positioning System (GPS) 9, a wireless communication unit 10, and a map information storage unit 11. Further, the vehicle system 2 includes a steering actuator 12, a steering device 13, a brake actuator 14, a brake device 15, an accelerator actuator 16, and an accelerator device 17.

The vehicle control unit 3 includes an Electronic Control Unit (ECU). The electronic control unit includes a processor such as a Central Processing Unit (CPU), a Read Only Memory (ROM) storing various vehicle control programs, and a Random Access Memory (RAM) temporarily storing various vehicle control data. The processor develops a program selected from various vehicle control programs stored in the ROM onto the RAM, and executes various processing in cooperation with the RAM. The vehicle control unit 3 is configured to control traveling of the vehicle 1.

The sensor 5 includes an acceleration sensor, a speed sensor, a gyro sensor, or the like. The sensor 5 is configured to detect a traveling state of the vehicle 1 and output traveling state information to the vehicle control unit 3. The sensor 5 may further include a seating sensor which detects whether a driver is sitting on a driver seat, a face direction sensor which detects a direction of the face of the driver, an outside weather sensor which detects an outside weather condition, and a human sensor which detects whether there is a person in the vehicle. Further, the sensor 5 may include an illuminance sensor which detects the illuminance of the surrounding environment of the vehicle 1.

The camera 6 is, for example, a camera including an imaging element such as a Charge-Coupled Device (CCD) or a complementary MOS (CMOS). The camera 6 is a camera which detects visible light or an infrared camera which detects infrared rays. The radar 7 is a millimeter wave radar, a microwave radar, a laser radar, or the like. The camera 6 and the radar 7 are configured to detect the surrounding environment of the vehicle 1 (other vehicles, pedestrians, road shapes, traffic signs, obstacles, or the like) and output the surrounding environment information to the vehicle control unit 3.

The HMI 8 includes an input unit which receives an input operation from the driver, and an output unit which outputs traveling information or the like to the driver. The input unit includes a steering wheel, an accelerator pedal, a brake pedal, a driving mode switch which switches the driving mode of the vehicle 1, or the like. The output unit is a display which displays various kinds of traveling information.

The GPS 9 is configured to acquire current position information of the vehicle 1 and output the acquired current position information to the vehicle control unit 3. The wireless communication unit 10 is configured to receive the traveling information of another vehicle around the vehicle 1 from the other vehicle and transmit the travel information of the vehicle 1 to the other vehicle (vehicle-to-vehicle communication). The wireless communication unit 10 is configured to receive infrastructure information from infrastructure equipment such as a traffic light and a sign lamp and transmit the traveling information of the vehicle 1 to the infrastructure equipment (road-to-vehicle communication). The map information storage unit 11 is an external storage device such as a hard disk drive storing map information and is configured to output the map information to the vehicle control unit 3.

When the vehicle 1 travels in the automated driving mode, the vehicle control unit 3 automatically generates at least one of a steering control signal, an accelerator control signal, and a brake control signal based on the traveling state information, the surrounding environment information, the current position information, the map information or the like. The steering actuator 12 is configured to receive the steering control signal from the vehicle control device 3 and control the steering device 13 based on the received steering control signal. The brake actuator 14 is configured to receive the brake control signal from the vehicle control device 3 and control the brake device 15 based on the received brake control signal. The accelerator actuator 16 is configured to receive the accelerator control signal from the vehicle control device 3 and control the accelerator device 17 based on the received accelerator control signal. Accordingly, the traveling of the vehicle 1 is automatically controlled by the vehicle system 2 in the automated driving mode.

Meanwhile, when the vehicle 1 travels in the manual driving mode, the vehicle control unit 3 generates the steering control signal, the accelerator control signal, and the brake control signal according to a manual operation of the driver to the accelerator pedal, the brake pedal and the steering wheel. Accordingly, in the manual driving mode, since the steering control signal, the accelerator control signal, and the brake control signal are generated by the manual operation of the driver, the traveling of the vehicle 1 is controlled by the driver.

Next, the driving mode of the vehicle 1 will be described. The driving mode includes the automated driving mode and the manual driving mode. The automated driving mode includes a fully automated driving mode, a high-grade driving assistance mode, and a driving assistance mode. In the fully automated driving mode, the vehicle system 2 automatically performs all traveling control including steering control, brake control, and accelerator control, and the driver is not in a state of being capable of driving the vehicle 1. In the high-grade driving assistance mode, the vehicle system 2 automatically performs all the traveling control including the steering control, the brake control, and the accelerator control, and the driver does not drive the vehicle 1 while the driver is capable of driving the vehicle 1. In the driving assistance mode, the vehicle system 2 automatically performs some of the traveling controls including the steering control, the brake control, and the accelerator control, and the driver drives the vehicle 1 under the driving assistance of the vehicle system 2. Meanwhile, in the manual driving mode, the vehicle system 2 does not automatically perform the traveling control, and the driver drives the vehicle 1 without the driving assistance of the vehicle system 2.

The driving mode of the vehicle 1 may be switched by operating the driving mode switch. In this case, the vehicle control unit 3 switches the driving mode of the vehicle 1 among the four driving modes (the fully driving mode, the high-grade driving assistance mode, the driving assistance mode, and the manual driving mode) according to the operation of the driver to the driving mode switch. Further, the driving mode of the vehicle 1 may be automatically switched based on information on a traveling permitted section where the traveling of the automated driving vehicle is permitted and a traveling prohibited section where the traveling of the automated driving vehicle is prohibited or information on the outside weather condition. In this case, the vehicle control unit 3 switches the driving mode of the vehicle 1 based on these kinds of information. Further, the driving mode of the vehicle 1 may be automatically switched by using the seating sensor, the face direction sensor, or the like. In this case, the vehicle control unit 3 switches the driving mode of the vehicle 1 based on an output signal from the seating sensor or the face direction sensor.

Figure 3:
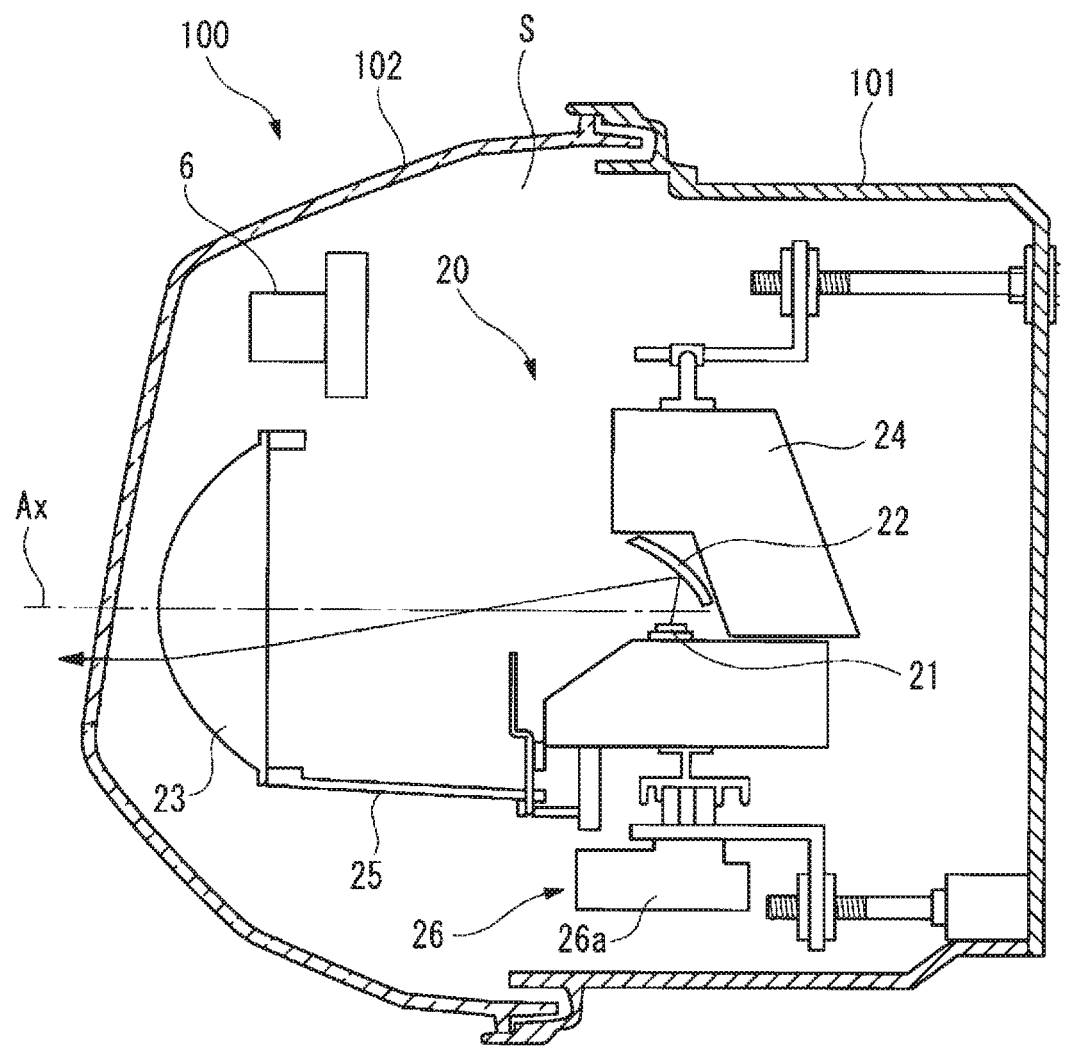
FIG. 3 is a cross-sectional view of the lighting device according to a first embodiment of the present invention.

Next, the lighting device 100 will be described in detail with reference to FIG. 3. FIG. 3 is a cross-sectional view of the lighting device 100.

As shown in FIG. 3, the lighting device 100 includes a housing 101 having an opening in the front, and an outer cover 102 which closes the opening and forms a lamp chamber S together with the housing 101. A light source unit 20 which emits light in a direction of an optical axis Ax extending in the front-rear direction of a lamp is provided inside the lamp chamber S. The light source unit 20 includes a light source 21 such as an LED, a reflector 22 which reflects light emitted from the light source 21 toward the front of the lamp, and a projection lens 23 provided in front of the reflector 22.

The projection lens 23 emits the light emitted from the light source 21 and reflected by the reflector 22 toward the front of the lamp. The lighting device 100 arranged in a right front portion of the vehicle forms a right light distribution pattern PR (see FIG. 4) in front of the lamp. The lighting device 100 arranged in a left front portion of the vehicle forms a left light distribution pattern PL (see FIG. 4) in front of the lamp.

The light source 21 and the reflector 22 are mounted on a base portion 24. The projection lens 23 is fixed to a lens holder 25 fixed to the base portion 24. The base portion 24 is displaceably supported by the housing 101 via a swivel mechanism 26. The swivel mechanism 26 is an example of an optical axis changing mechanism. The swivel mechanism 26 includes a motor 26a. The swivel mechanism 26 turns the optical axis Ax of the light source unit 20 in the left-right direction. Accordingly, the right light distribution pattern PR and the left light distribution pattern PL formed by the lighting device 100 is displaceable in a horizontal direction.

Referring back to FIG. 2, the swivel mechanism 26 is electrically connected to an illuminance control unit 27. The illuminance control unit 27 is electrically connected to the vehicle control unit 3. The vehicle control unit 3 receives an image in front of the vehicle from the camera 6 and transmits a signal corresponding to the presence of the oncoming vehicle to the illuminance control unit 27. The illuminance control unit 27 drives the swivel mechanism 26 according to the signal corresponding to the presence of the oncoming vehicle transmitted from the vehicle control unit 3.

As shown in FIGS. 4, 5, 9, and 10, the light source unit 20 shown in FIG. 3 is configured such that a light distribution pattern can be formed by emitting light toward a virtual region VA which expands in a rectangular shape at 15° to the left and the right and 6° to the upper and lower with respect to a reference line AC extending in the horizontal direction from a center position of the lighting device 100 toward the front of the vehicle. The light source unit 20 may be configured to emit light toward an outside of the virtual region VA.

Figure 4:
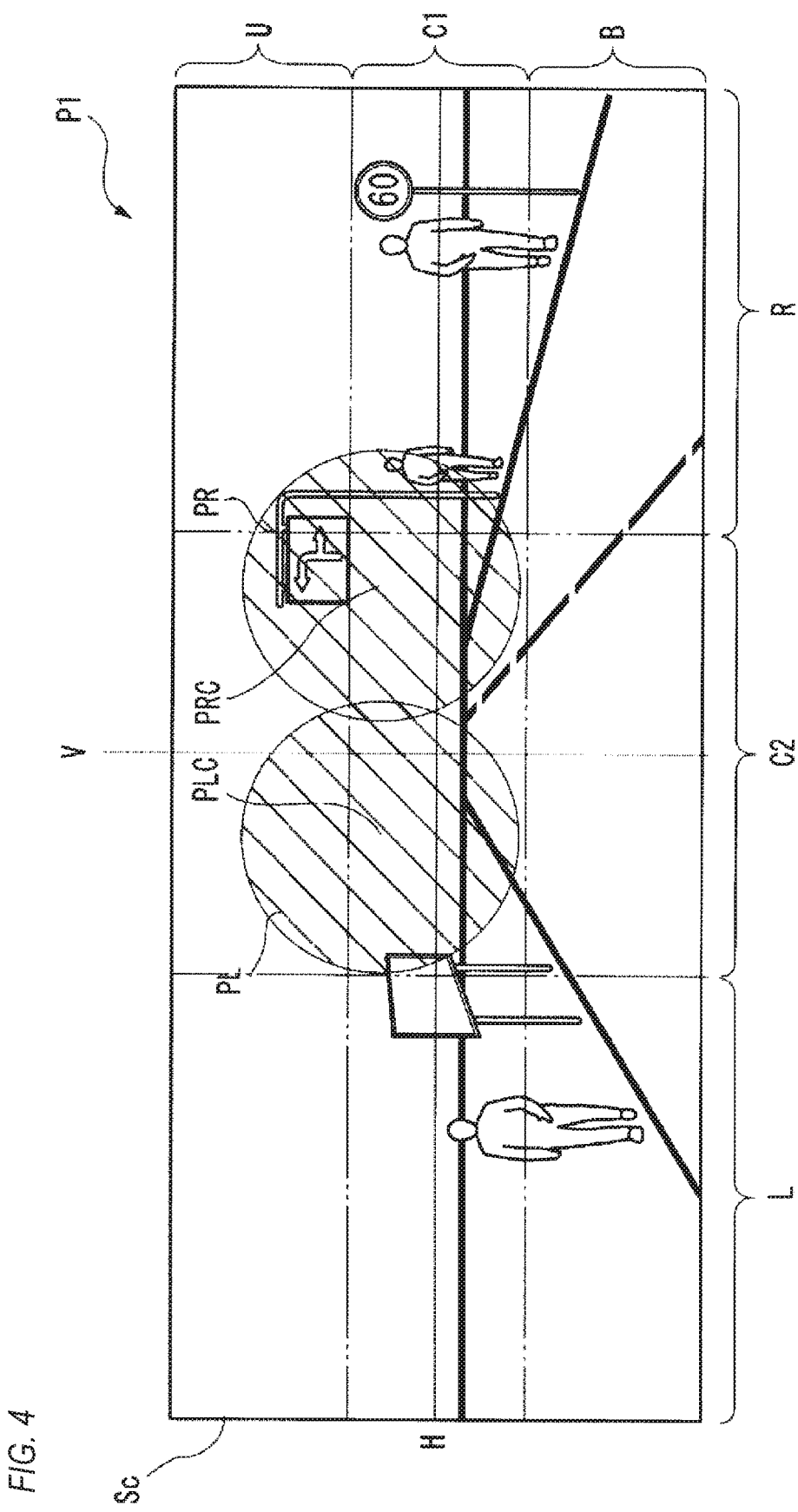
FIG. 4 is a view showing a front of the vehicle when no oncoming vehicle is present, and shows a first light distribution pattern.
Figure 5:
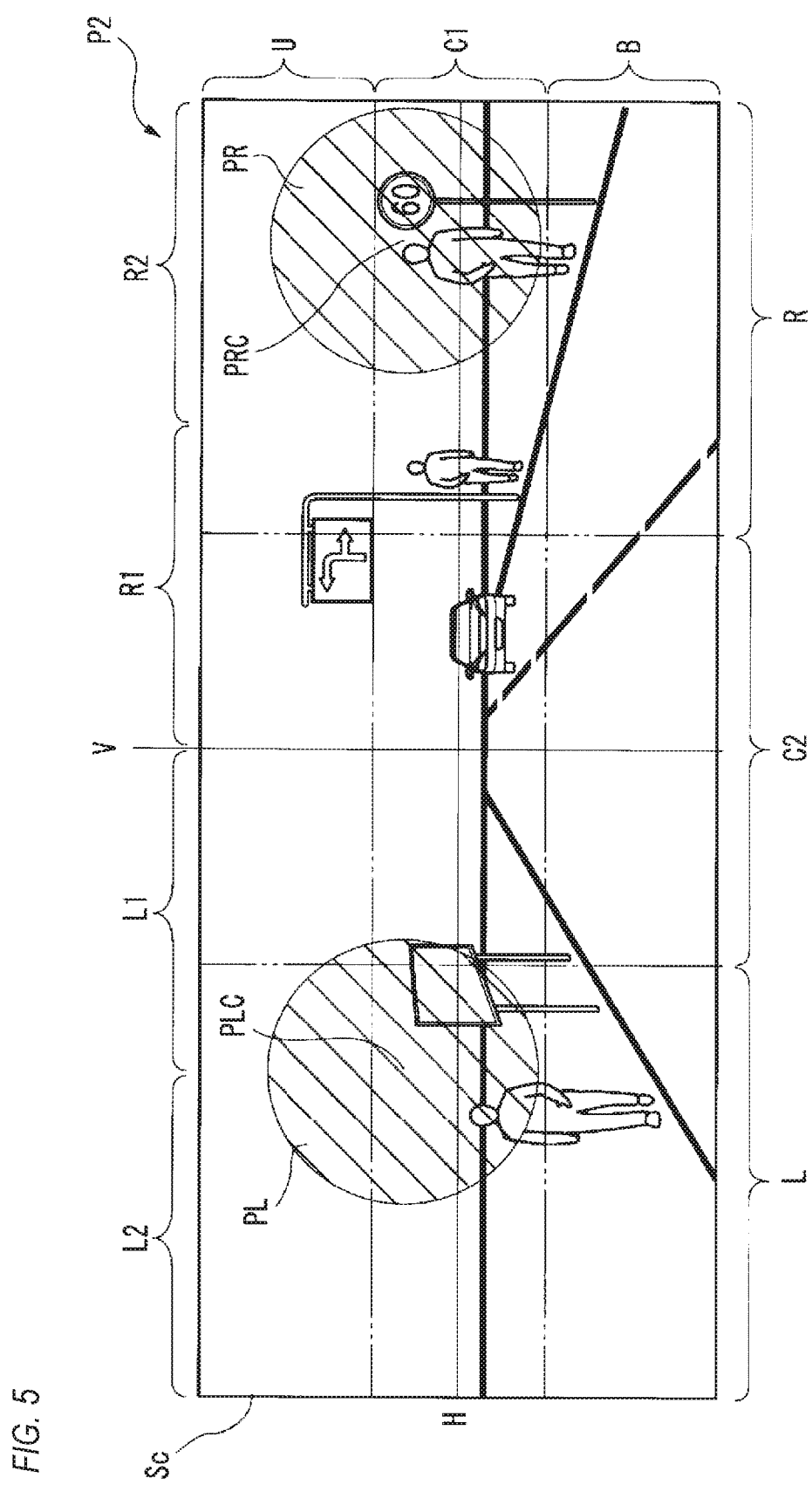
FIG. 5 is a view showing the front of the vehicle when an oncoming vehicle is present, and shows a second light distribution pattern.

FIGS. 4 and 5 are diagrams showing the front of the vehicle. FIGS. 4 and 5 show a state in which the light emitted from a center in front of the lighting device 100 mounted on the right front portion of the vehicle toward the virtual region VA expanding in the rectangular shape forms a light distribution pattern on a virtual vertical screen Sc provided 25 m in front of the lighting device 100. FIG. 4 shows a state in which no oncoming vehicle is present. FIG. 5 shows a state in which the oncoming vehicle is present.

Figure 9:
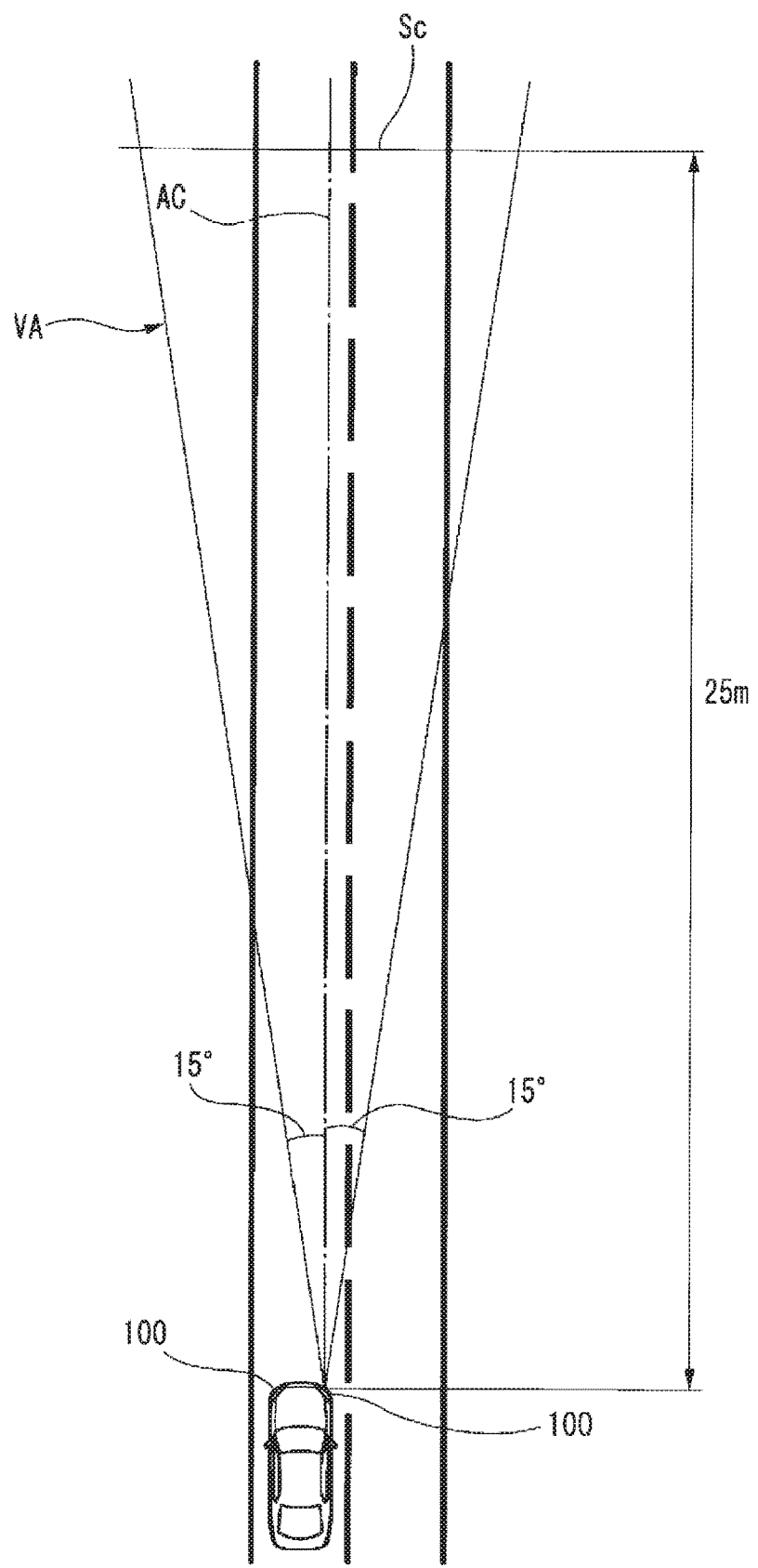
FIG. 9 shows the vehicle as viewed from above.
Figure 10:
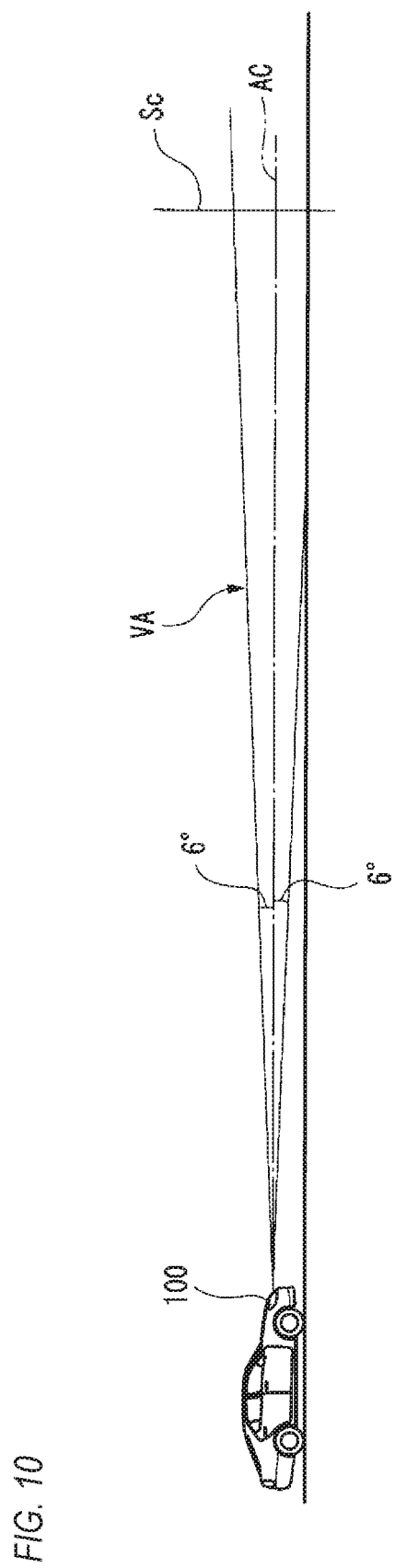
FIG. 10 shows the vehicle as viewed from the right.

FIG. 9 shows the vehicle as viewed from above. FIG. 10 shows the vehicle as viewed from the right. As shown in FIG. 9, a virtual straight line extending in the horizontal direction toward the front of the vehicle from the center in the left-right direction and the upper-rear direction in a front surface of the lighting device 100 mounted on the right front portion of the vehicle is defined as the reference line AC. As shown in FIG. 9, the virtual region VA is a triangular region expanding in the left-right direction toward the front of the vehicle with reference to the reference line AC as viewed from above the vehicle. As shown in FIG. 10, the virtual region VA is a triangular region expanding in the upper-lower direction toward the front of the vehicle with reference to the reference line AC when viewed from a lateral side of the vehicle.

Although not shown, similarly, a virtual region VA is defined which expands in a rectangular shape forward from the reference line AC extending forward from the center of the lighting device 100 mounted on the left front portion of the vehicle.

Strictly speaking, the virtual region expanding from the reference line AC extending forward from the center of the lighting device 100 mounted on the right front portion of the vehicle is different from the virtual region expanding from reference line AC extending forward from the center of the lighting device 100 mounted on the left front portion of the vehicle. However, since the width of the vehicle in the left-right direction is considerably smaller than 25 m, images formed on the virtual vertical screen Sc which is installed 25 m in front of the vehicle by the virtual regions substantially coincide with each other. Therefore, in the following description using FIGS. 4 and 5, in order to describe an image formed on the virtual vertical screen Sc which is installed 25 m in front of the vehicle, the virtual region based on the lighting device 100 mounted on the right front portion and the virtual region based on the lighting device 100 mounted on the left front portion are not distinguished from each other, and both are treated as the same.

FIGS. 4 and 5 show a V line and an H line on the virtual vertical screen Sc. The V line is a straight line extending in a vertical direction through the reference line AC extending in the horizontal direction from the center of the lighting device 100 mounted on the right front portion of the vehicle toward the front of the vehicle. The H line is a straight line extending in the horizontal direction through the reference line AC extending in the horizontal direction from the center of the lighting device 100 mounted on the right front portion of the vehicle toward the front of the vehicle.

As shown in FIGS. 4 and 5, an upper edge of the rectangular region formed on the virtual vertical screen Sc by the virtual region VA is located above the H line by 6° and extends in the horizontal direction. A lower edge of the rectangular region formed on the virtual vertical screen Sc by the virtual region VA is located below the H line by 6° and extends in the horizontal direction. A right edge of the rectangular region formed on the virtual vertical screen Sc by the virtual region VA is located 15° to the right of the V line and extends in the vertical direction. A left edge of the rectangular region formed on the virtual vertical screen Sc by the virtual region VA is located 15° to the left of the V line and extends in the vertical direction.

The light source unit 20 of the lighting device 100 is configured to emit light within a frame shown in FIGS. 4 and 5 of the virtual vertical screen Sc installed 25 m in front of the vehicle. The light source unit 20 is configured to form the light distribution pattern by emitting the light toward a part or the whole of the frame.

In FIGS. 4 and 5, in the following description, the virtual vertical screen Sc is divided equally into an upper portion U, a first central portion C1, a lower portion B in the upper-lower direction. Further, the virtual vertical screen Sc is divided equally into a left portion L, a second central portion C2, a right portion R in the left-right direction.

That is, the first central portion C1 is a region expanding forward at an angle of 2° in the upper-lower direction from the reference line AC. The upper portion U is a region expanding forward at an angle of 2° to 6° to the upper side from the reference line AC. The lower portion B is a region expanding forward at an angle of 2° to 6° to the lower side from the reference line AC. The second central portion C2 is a region expanding forward at an angle of 10° in the left-right direction from the reference line AC. The left portion L is a region expanding forward at an angle of 10° to 30° to the left from the reference line AC. The right portion R is a region expanding forward at an angle of 10° to 30° to the right from the reference line AC.

The lighting device 100 can form a first light distribution pattern P1 in which the right light distribution pattern PR overlaps the left light distribution pattern PL as shown in FIG. 4 at the second central portion C2 in the left-right direction, and a second light distribution pattern P2 in which the right light distribution pattern PR and the left light distribution pattern PL are separated in the left-right direction as shown in FIG. 5. In FIGS. 4 and 5, a region of a specific illuminance or more is shown as a light distribution pattern.

Figure 11:
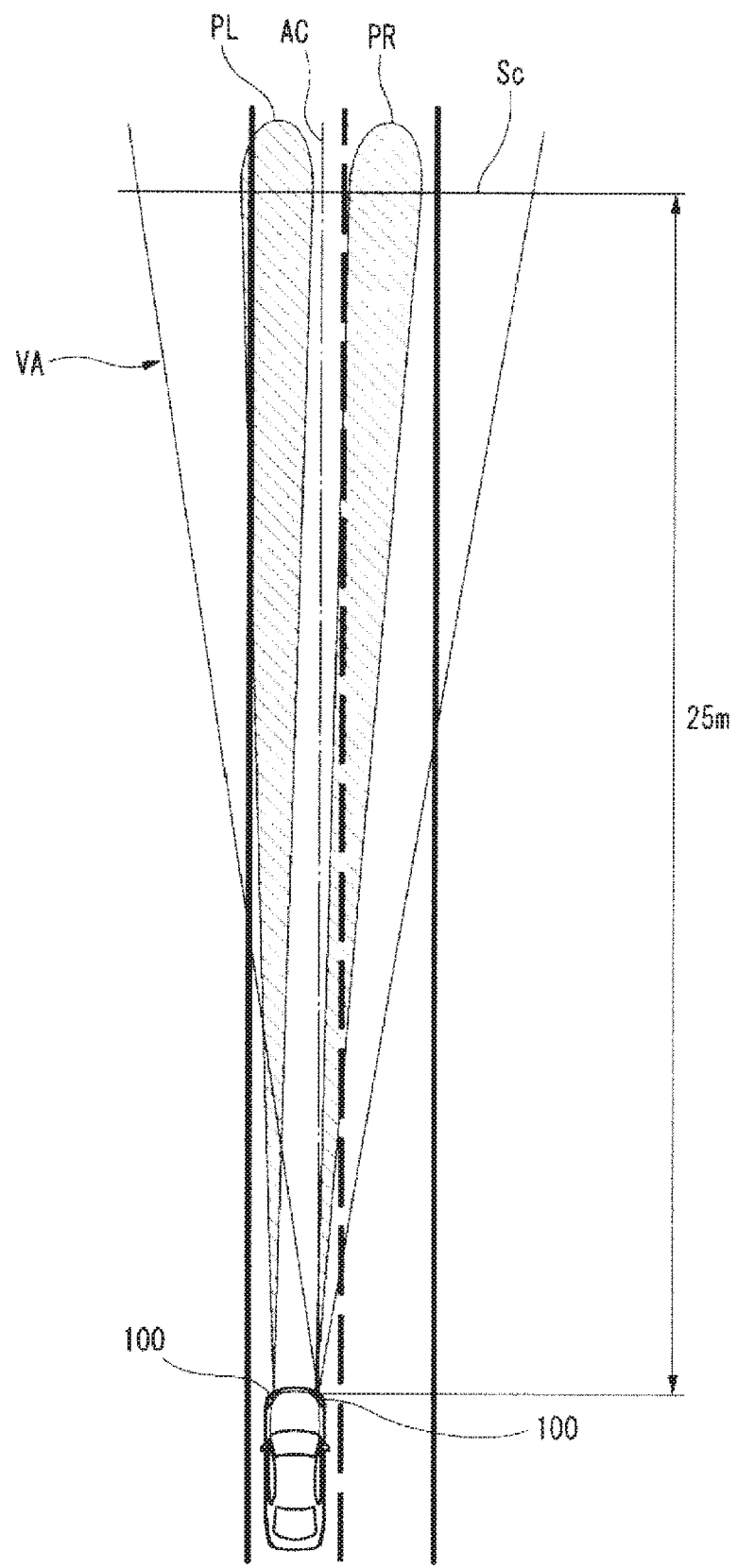
FIG. 11 is a view showing the vehicle mounted with the lighting device which emits the first light distribution pattern as viewed from above.

In the first light distribution pattern P1 shown in FIG. 4, a center PRC of the right light distribution pattern PR is located in the second central portion C2 in the left-right direction of the virtual vertical screen Sc, and a center PLC of the left light distribution pattern PL is located in the second central portion C2 in the left-right direction of the virtual vertical screen Sc. In the first light distribution pattern P1, light having high illuminance is emitted toward the second central portion C2 of the virtual vertical screen Sc. Since the light having high illuminance is emitted toward a distant location, the visibility for a camera or a driver of an own vehicle is enhanced. The first light distribution pattern P1 corresponds to a so-called normal high beam light distribution pattern. FIG. 11 is a view showing the vehicle mounted with the lighting device 100 which emits the first light distribution pattern P1 as viewed from above.

The second light distribution pattern P2 shown in FIG. 5 is obtained by driving the swivel mechanism 26 so as to deviate the right light distribution pattern PR to the right and deviate the left light distribution pattern PL to the left from the first light distribution pattern P1 shown in FIG. 4. The second light distribution pattern P2 is obtained by turning the light source unit 20 of the lighting device 100 provided in the right front portion of the vehicle to the right and turning the light source unit 20 of the lighting device 100 provided in the left front portion of the vehicle to the left by the left and right swivel mechanisms 26, respectively.

More specifically, by turning the right lighting device 100 provided in the right front portion of the vehicle to the right, a state in which the light is emitted toward the second central portion C2 in a right virtual region expanding forward from the right lighting device 100 is made to transition to a state in which the light is emitted toward the right portion R in the right virtual region. By turning the left lighting device 100 provided in the left front portion of the vehicle to the left, a state in which the light is emitted toward the second central portion C2 in a left virtual region expanding forward from the left lighting device 100 is made to transition to a state in which the light is emitted toward the left portion L in the left virtual region.

Figure 12:
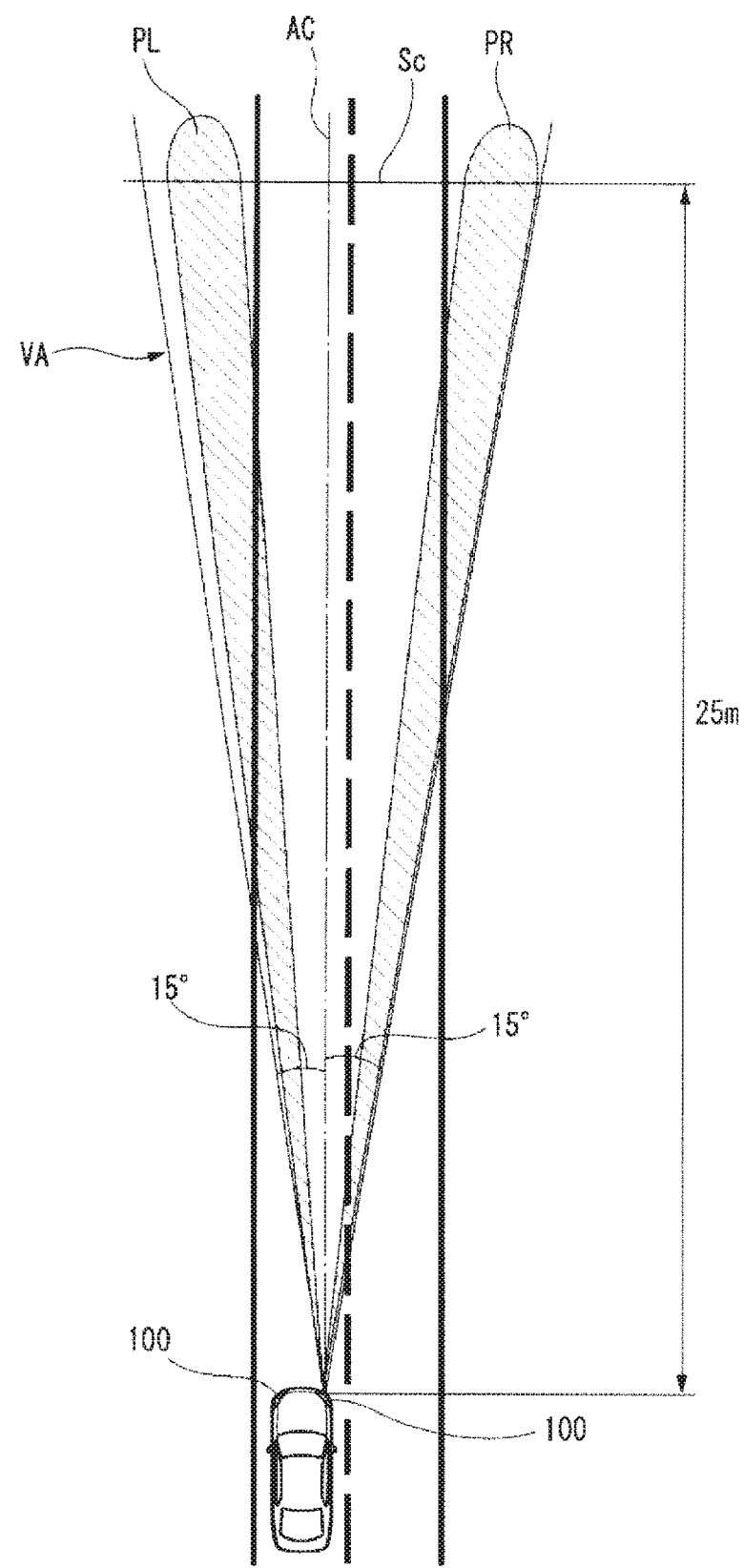
FIG. 12 is a view showing the vehicle mounted with the lighting device which emits the second light distribution pattern as viewed from above.

In the second light distribution pattern P2, the center PRC of the right light distribution pattern PR is deviated rightward from the V line of the virtual vertical screen Sc, and the center PLC of the left light distribution pattern PL is deviated leftward from the V line in the left-right direction of the virtual vertical screen Sc. FIG. 12 is a view showing the vehicle mounted with the lighting device 100 which forms the second light distribution pattern P2 as viewed from above.

However, it is difficult for the camera to recognize a bright object and a dark object simultaneously as compared with human eyes. When the bright object is imaged, the sensitivity of the camera is set to be low, or the exposure time is set to be short. When the dark object is imaged, the sensitivity of the camera is set to be high or the exposure time is set to be long. As described above, when the bright object is imaged and when the dark object is imaged, optimum camera settings are different. Therefore, it is difficult for the camera to recognize the bright object and the dark object simultaneously as compared with the human eyes.

A camera mounted on an automated drivable vehicle is set to have a high sensitivity or a long exposure time in order to acquire a clear image at night. However, when bright light of the headlight is incident on the camera set as described above, halation occurs in the camera. If the sensitivity of the camera is set to be low or the exposure time is set to be short such that halation does not occur in the camera, the image of the dark object cannot be clearly obtained. Meanwhile, in order to prevent halation from occurring in the camera of the oncoming vehicle, it is not realistic to lower the overall illuminance of the light emitted from the lighting device of the own vehicle.

The present inventors examined in which region of the virtual vertical screen Sc in front of the own vehicle the oncoming vehicle appears. As shown in FIG. 5, the present inventors found that the oncoming vehicle appears in the first central portion C1 in the upper-lower direction and the second central portion C2 in the left-right direction. Therefore, in order to prevent halation from occurring in the camera of the oncoming vehicle, the present inventors considered reducing only the illuminance of the region.

In the lighting device 100 according to the first embodiment, when the vehicle control unit 3 determines that no oncoming vehicle is in front of the own vehicle from the image acquired by the camera 6, the illuminance control unit 27 drives the swivel mechanism 26 to form the first light distribution pattern P1 shown in FIG. 4. The vehicle control unit 3 is an example of an oncoming vehicle detection unit. Meanwhile, when the vehicle control unit 3 determines that the oncoming vehicle is in front of the own vehicle from the image acquired by the camera 6, the illuminance control unit 27 drives the swivel mechanism 26 to form the second light distribution pattern P2 shown in FIG. 5.

In this way, according to the lighting device 100 of the first embodiment, the illuminance control unit 27 reduces the illuminance of the light emitted toward the first central portion C1 in the upper-lower direction and the second central portion C2 in the left-right direction in which the oncoming vehicle is present according to the signal transmitted when the vehicle control unit 3 detects the presence of the oncoming vehicle. Therefore, halation caused by the lighting device 100 of the own vehicle hardly occurs in the camera of the oncoming vehicle.

In the first embodiment, the camera 6 acquires information in front of the vehicle and transmits a signal corresponding to the acquired information to the oncoming vehicle detection unit. As shown in FIG. 3, the camera 6 is provided in the lamp chamber S together with the light source unit 20. In this way, since the lighting device 100 includes the camera 6, the vehicle 1 may not have a separate camera.

It goes without saying that unlike the first embodiment, the camera may be provided separately from the lighting device 100.

In the lighting device 100 of the first embodiment, the light source unit 20 is supported by the swivel mechanism 26 which turns the optical axis Ax of the light source unit 20 in the left-right direction. The swivel mechanism 26 is an example of an optical axis changing mechanism.

When the signal transmitted from the vehicle control unit 3 when the presence of the oncoming vehicle is detected is not input to the illuminance control unit 27, that is, when the vehicle control unit 3 does not detect the presence of the oncoming vehicle, the illuminance control unit 27 drives the swivel mechanism 26 to form the first light distribution pattern P1 shown in FIG. 4. The first light distribution pattern P1 is the high beam light distribution pattern in which the optical axis Ax of the light source unit 20 extends toward the center in front of the vehicle.

When the signal transmitted from the vehicle control unit 3 when the presence of the oncoming vehicle is detected is input to the illuminance control unit 27, the illuminance control unit 27 deviates the optical axis Ax of the light source unit 20 to at least one of the left and the right as shown in FIG. 5. Accordingly, the illuminance of the region located in the first central portion C1 and the second central portion C2 on the virtual vertical screen Sc is lowered, and the illuminance of at least one of the region located in the first central portion C1 and the left portion L and the region located in the first central portion C1 and the right portion R is raised.

As shown in FIG. 5, on the virtual vertical screen Sc, a pedestrian may be present in regions to the left and to the right of the region where the oncoming vehicle may be present. Further, a sign having a high reflectance may be present above a region where the oncoming vehicle may be present, and a road having a high reflectivity may be present below the region where the oncoming vehicle may be present.

Therefore, according to the lighting device 100 of one or more embodiments of the present invention, the light emitted toward the region where the oncoming vehicle may be present is emitted toward the region where the pedestrian may be present. Therefore, halation is suppressed for the camera of the oncoming vehicle, and the visibility of the pedestrian is enhanced for the driver/camera of the own vehicle. At this time, since the illuminance of the upper portion U where the sign having a high reflectivity may be present and the illuminance of the lower portion B where the road having a high reflectivity may be present do not become high, the driver or the camera of the own vehicle is not dazzled by the sign or the reflected light from the road.

As shown in FIG. 4, in the first light distribution pattern P1, the right light distribution pattern PR overlaps the left light distribution pattern PL at the second central portion C2 in the left-right direction. Therefore, in the first light distribution pattern P1, two points in descending order of illuminance are located in the second central portion C2 in the left-right direction on the virtual vertical screen Sc.

Meanwhile, as shown in FIG. 5, in the second light distribution pattern P2, the right light distribution pattern PR and the left light distribution pattern PL are separated in the left-right direction. A point having the highest illuminance in the right light distribution pattern PR is located in the substantially central portion PRC of the right light distribution pattern PR. The substantially central portion PRC of the right light distribution pattern PR having the highest illuminance is deviated rightward from the V line. A point having the highest illuminance in the left light distribution pattern PL is located in the substantially central portion PLC of the left light distribution pattern PL. The substantially central portion PLC of the left light distribution pattern PL having the highest illuminance is deviated leftward from the V line. That is, the two points in the descending order of illuminance are deviated rightward or leftward from the V line on the virtual vertical screen Sc.

In this way, when the oncoming vehicle is not present, since the light having the highest illuminance illuminates the distant location, the visibility of the distant location is enhanced for the driver and the camera of the own vehicle. Further, when the oncoming vehicle is present, since the light having the highest illuminance illuminates a region deviated to the left and right from the V line where the oncoming vehicle is present, halation hardly occurs in the camera of the oncoming vehicle.

Further, as shown in FIG. 5, in the second light distribution pattern P2, it is preferable that the two points PLC, PRC in descending order of illuminance are located in the left portion L and the right portion R of the virtual vertical screen Sc in the left-right direction. The pedestrian close to the own vehicle in the front-rear direction is likely to be in the left portion L and the right portion R of the virtual vertical screen Sc. Therefore, according to the lighting device 100 of the first embodiment, since bright light is emitted toward the left portion L and the right portion R where pedestrian is likely to be present, the pedestrian can be easily recognized.

Further, in the second light distribution pattern P2, the virtual vertical screen Sc is divided equally into four regions in the left-right direction, and is defined as regions L2, L1, R1, R2 from left to right. In the second light distribution pattern P2, it is preferable that the two points PLC, PRC in descending order of illuminance are located in the left end region L2 and the right end region R2.

According to the lighting device 100 of the first embodiment, light having high illuminance is emitted toward the end portions L2, R2 in the left-right direction. Since pedestrian close to the own vehicle may be present in the end portions L2, R2 in the left-right direction on the virtual vertical screen Sc, the pedestrian close to the own vehicle can be easily recognized.

Second Embodiment

Figure 6:
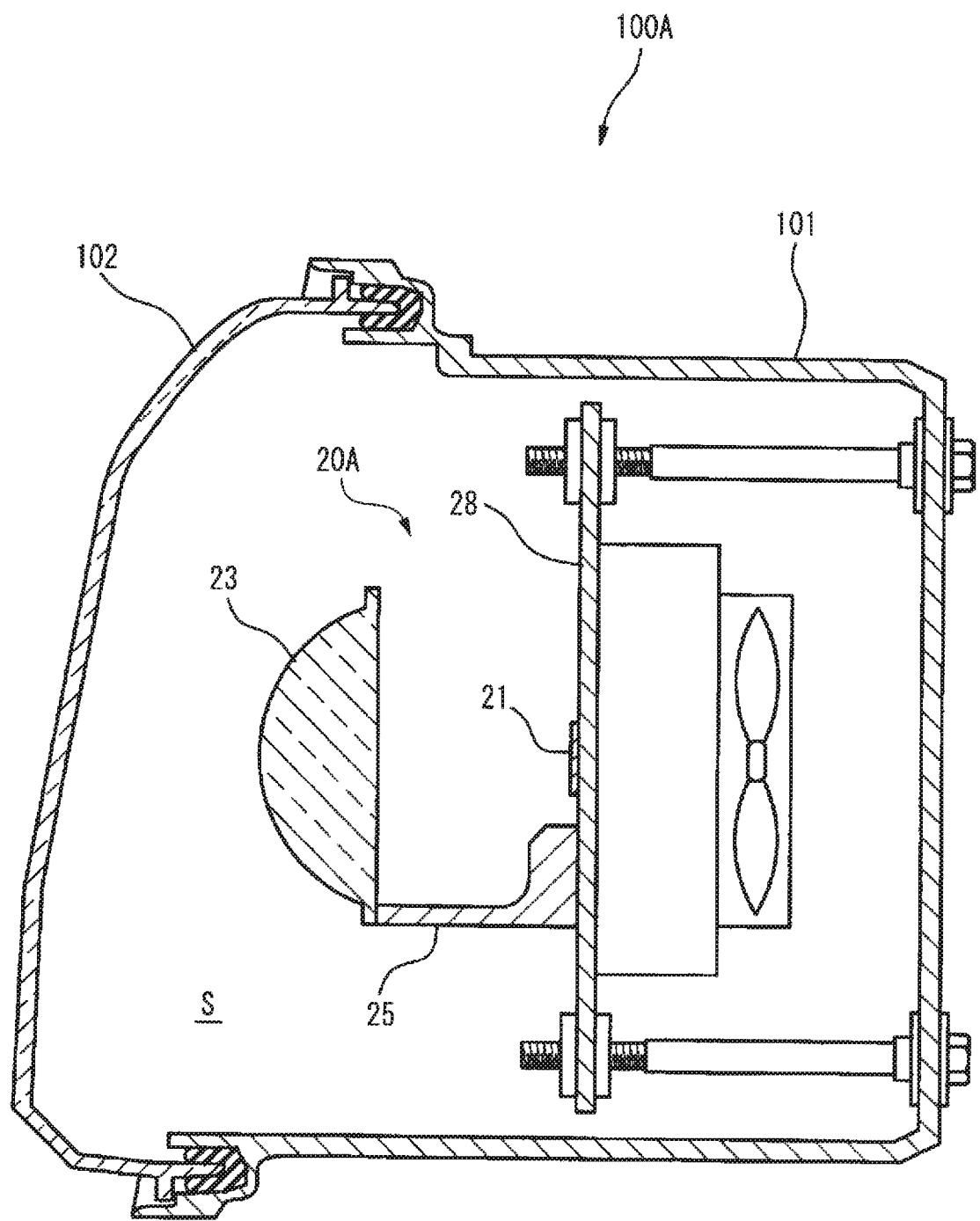
FIG. 6 is a cross-sectional view of a lighting device according to a second embodiment of the present invention.

FIG. 6 is a cross-sectional view of a lighting device 100A according to a second embodiment of the present invention. The same members as those in the first embodiment are denoted by the same reference numerals, and a description thereof will be omitted.

As shown in FIG. 6, the lighting device 100A includes a light source unit 20A in the lamp chamber S. The light source unit 20A includes the light source 21 and the projection lens 23. The light emitted from the light source 21 is emitted toward the front of the lamp via the projection lens 23.

The light source 21 is fixed to the housing 101 via a mounting substrate 28. The projection lens 23 is fixed to the mounting substrate 28 via the lens holder 25. In this way, the light source unit 20A is fixed to the housing 101 so as not to be turnable in the left-right direction.

Figure 7:
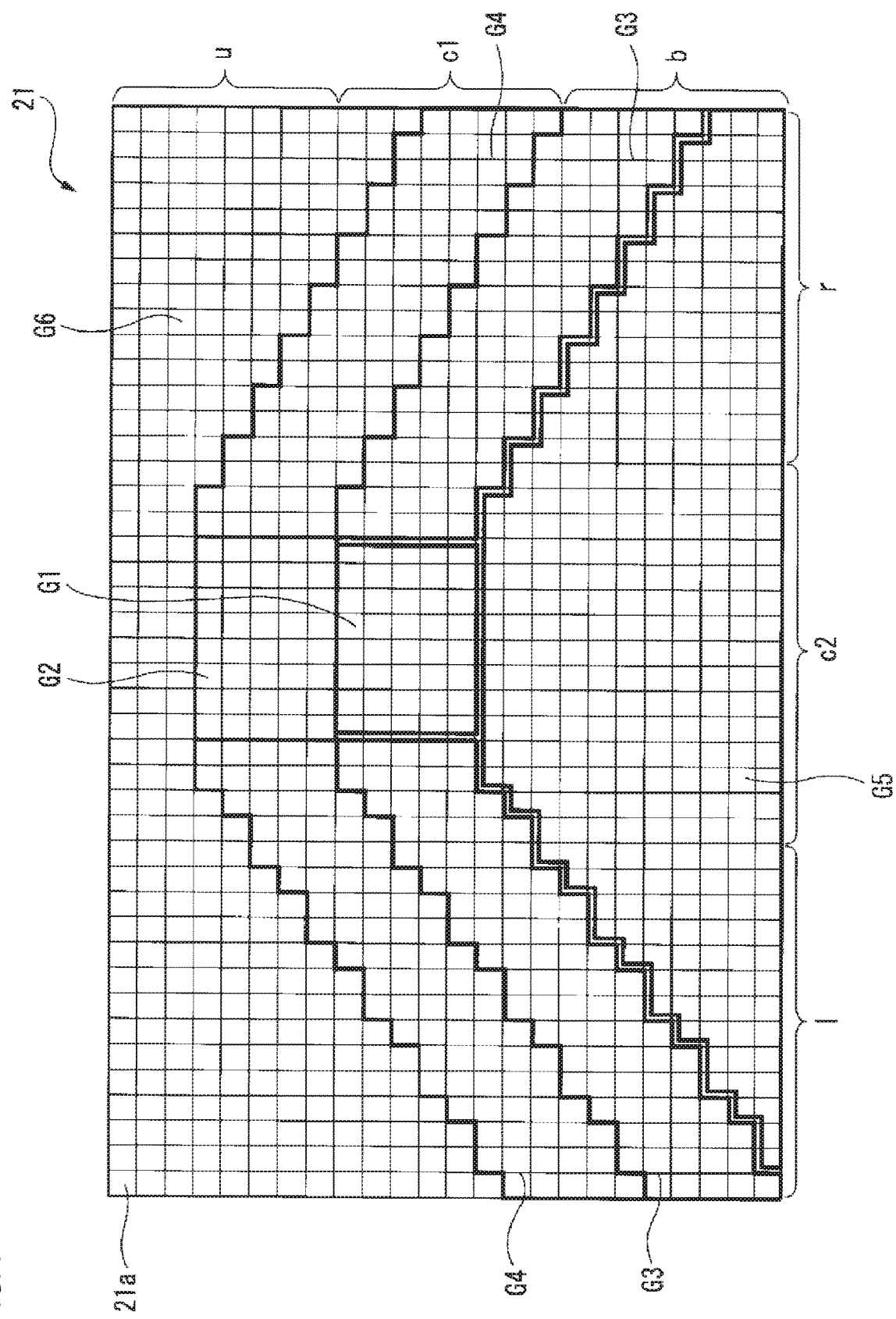
FIG. 7 is an enlarged front view of a light source shown in FIG. 6.

FIG. 7 is an enlarged front view of the light source 21. Light emitting surfaces of a plurality of LED chips 21a are arranged in a matrix to form the light source 21. The light emitting surface of the light source 21 is configured in a substantially rectangular shape in the front view. The illuminance control unit 27 can control turning on/off of the light emitting surface by controlling ON/OFF of energization of the individual LED chips 21a. The light source 21 is arranged in front of a rear side focal point of the projection lens 23. The projection lens 23 magnifies a light emission state of the LED chips 21a arranged in the matrix and projects the light toward the front of the lamp.

In the second embodiment, as shown in FIG. 7, the individual LED chips 21a are grouped into a first group G1, a second group G2, a third group G3, a fourth group G4, a fifth group G5, and a sixth group G6. As shown in FIG. 7, the light source 21 is equally divided into an upper portion u, a first central portion c1, a lower portion b in the upper-lower direction, and is equally divided into a right portion r, a second central portion c2, a left portion 1 in the left-right direction.

LED chips 21a located in the first central portion c1 in the upper-lower direction and in the second central portion c2 in the left-right direction belong to the first group G1.

LED chips 21a located in the second central portion c2 in the left-right direction and above the first group G1 in the upper-lower direction belong to the second group G2.

LED chips 21a arranged to extend in a strip shape in a lower right direction and a lower left direction from the first group G1 belong to the third group G3.

LED chips 21a arranged to extend in a strip shape in the lower right direction and the lower left direction from the second group G2 and are located above the third group G3 belong to the fourth group G4.

LED chips 21a located below the first group G1 and the third group G3 belong to the fifth group G5.

LED chips 21a located above the second group G2 and the fourth group G4 belong to the sixth group G6.

Figure 8:
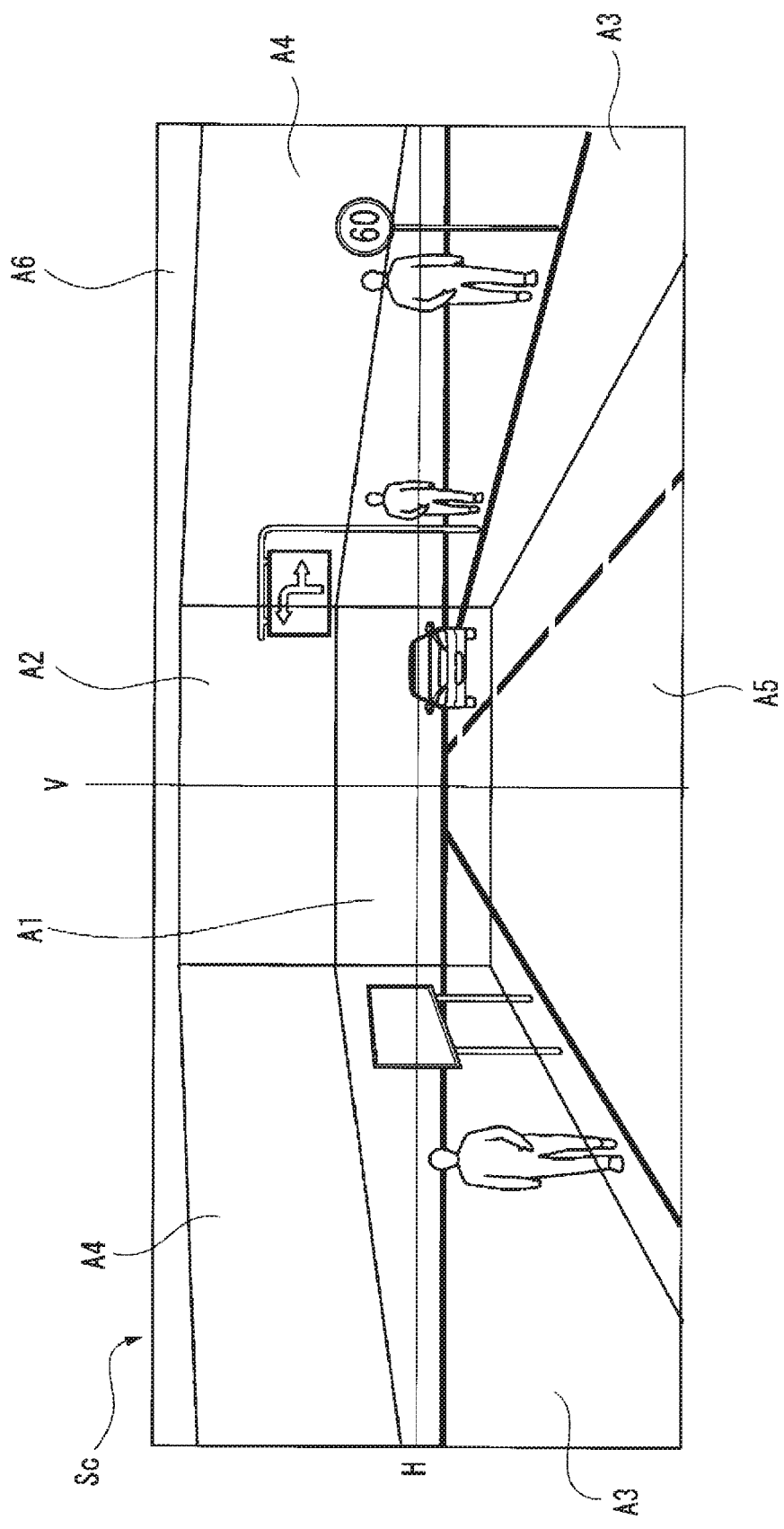
FIG. 8 is a view showing a light distribution pattern formed by the lighting device according to the second embodiment.

FIG. 8 is a view showing a light distribution pattern formed by the lighting device 100A according to the second embodiment.

When the LED chips 21a belonging to the first group G1 shown in FIG. 7 is turned on, as shown in FIG. 8, light is emitted toward a region A1 located in the first central portion c1 and the second central portion c2 of the virtual vertical screen Sc. Accordingly, the light is emitted toward a front surface of the own vehicle.

When the LED chips 21a belonging to the second group G2 are turned on, the light is emitted toward a region A2 located in the upper portion u in the upper-lower direction and the second central portion c2 in the left-right direction. Accordingly, the light is emitted toward a region where a road sign or the like displayed above the road may be located.

When the LED chips 21a belonging to the third group G3 are turned on, light is emitted toward a region A3 which extends rightward and obliquely downward in a strip shape from the region of the first central portion c1 in the upper-lower direction and the second central portion c2 in the left-right direction and a region A3 which extends leftward and obliquely downward in a strip shape from the region of the first central portion c1 in the upper-lower direction and the second central portion c2 in the left-right direction. Accordingly, it is possible to emit light toward a region where the pedestrian or the like walking on a road shoulder may be present.

When the LED chips 21a belonging to the fourth group G4 are turned on, light is emitted toward a region A4 which extends rightward and obliquely downward in a strip shape from the upper portion u in the upper-lower direction and the second central portion c2 in the left-right direction and a region A4 which extends leftward and obliquely downward in a strip shape from the upper portion u in the upper-lower direction and the second central portion c2 in the left-right direction. Accordingly, it is possible to emit light toward a region where the head of the pedestrian or a road sign, a signboard, or the like installed on the road shoulder may be present.

When the LED chips 21a belonging to the fifth group G5 are turned on, light can be emitted toward a lower region A5 including a road close to the own vehicle.

When the LED chips 21a belonging to the sixth group G6 are turned on, light can be emitted toward an upper region A6.

In the lighting device 100A according to the second embodiment, the illuminance control unit 27 collectively controls the turning on/off of the LED chips 21a for each group.

As described in the first embodiment, on the virtual vertical screen Sc, the region A1 of the first central portion c1 in the upper-lower direction and the second central portion c2 in the left-right direction may be a region where a distant object may be present, or a region where an oncoming vehicle may be present. In order to illuminate the distant object, it is preferable to emit light having high illuminance, but when light with high illuminance is emitted, halation may be caused in the camera of the oncoming vehicle.

Therefore, in the lighting device 100A according to the second embodiment, when the vehicle control unit 3 determines that the oncoming vehicle is not present and transmits a signal to the illumination control unit 27, the illuminance control unit 27 turns on the LED chips 21a belonging to the first group G1 according to the signal. Accordingly, a light distribution pattern having a high visibility of the distance location can be obtained.

Meanwhile, when the vehicle control unit 3 determines that the oncoming vehicle is present and transmits a signal to the illumination control unit 27, the illuminance control unit 27 turns off the LED chips 21a belonging to the first group G1 according to the signal. Accordingly, since no light is emitted toward the region A1, halation is not caused in the camera of the oncoming vehicle.

As described above, also in the second embodiment, the illuminance control unit 27 is configured to change the illuminance of at least a part of the light distribution pattern. The illuminance control unit 27 lowers the illuminance of the region located in the first central portion c1 and the second central portion c2 of the light distribution pattern according to the signal transmitted from the vehicle control portion 3 which transmits the signal according to the presence of the oncoming vehicle. Therefore, halation does not occur in the camera of the oncoming vehicle.

In the above description, the control for turning on/off the LED chips 21a by the illuminance control unit 27 is described, but the present invention is not limited thereto. In response to the signal transmitted when the vehicle control unit 3 determines that the oncoming vehicle is present, the illuminance control unit 27 may lower a current supplied to the LED chips 21a belonging to the first group G1 so as to lower the illuminance.

In the second embodiment, when a signal which determines that the pedestrian is present in front of the vehicle by the vehicle control unit 3 is input to the illuminance control unit 27, the illuminance control unit 27 may be configured to lower the current supplied to the LED chips 21a belonging to the third group G3. Accordingly, glare given to the pedestrian is suppressed.

Although the embodiments of the present invention have been described, it is needless to say that the technical scope of the present invention should not be interpreted in a limited manner by the description of the embodiments. The present embodiment is merely an example, and it is appreciated by those skilled in the art that various embodiments can be changed within the scope of the invention described in the claims. The technical scope of the present invention should be determined based on the scope of the invention described in the claims and the scope of equivalents thereof.

For example, in the above-described first embodiment, an example in which the lighting device is mounted on the right front portion and the left front portion of the vehicle is described, but the present invention is not limited thereto. Only one lighting device may be provided in the front portion of the vehicle, or three or more lighting devices may be provided in the front portion of the vehicle.

In one or more of the above embodiments, the operation mode of the vehicle is described as including the fully automated driving mode, the high-grade driving assistance mode, the driving assistance mode, and the manual driving mode, but the driving mode of the vehicle should not be limited to these four modes. The driving mode of the vehicle may include at least one of these four modes. For example, the driving mode of the vehicle may include only the fully automated driving mode.

Further, a classification and a display form of the driving mode of the vehicle may be appropriately changed according to regulations or rules related to automated driving in each country. Similarly, the definitions of the "fully automated driving mode", the "high-grade driving assistance mode", and the "driving assistance mode" described in the description of the embodiment are merely examples, and these definitions may be appropriately changed according to regulations or rules related to automated driving in each country.

In the first and second embodiments, the vehicle control unit 3 may be configured to transmit the signal to the illuminance control unit 27 when it is determined that the oncoming vehicle is an automated drivable vehicle. The illuminance control unit 27 may be configured to lower the illuminance of the light emitted toward the regions of the first central portions C1, c1 and the second central portions C2, c2 according to the signal.

The brightness causing halation in the camera of the oncoming vehicle is lower than the brightness causing the driver of the oncoming vehicle to feel glare. Therefore, the illuminance control unit may be configured to switch the light source unit between a first mode of illuminance higher than the brightness causing the driver of the oncoming vehicle to feel glare, a second mode darker than the first mode and brighter than the brightness which causes the camera of the oncoming vehicle to generate halation, and a third mode darker than the second mode.

The illuminance control unit may be configured to select the first mode according to the signal transmitted when the vehicle control unit determines that the oncoming vehicle is not present, the second mode according to the signal transmitted when the vehicle control unit determines that the oncoming vehicle which cannot perform automated driving is present, and the third mode according to the signal transmitted when the vehicle control unit 3 determines that the automated drivable vehicle is present.

According to such a configuration, when there is no risk of giving a glare to the driver of the oncoming vehicle and there is no risk of causing halation in the camera of the oncoming vehicle, the light source unit can be driven in the first mode to maximize the visibility of the own vehicle. Further, in a case where the oncoming vehicle cannot perform automated driving and does not include the camera, the light source unit can be driven in the second mode to maintain high visibility of the own vehicle while suppressing the glare given to the driver of the oncoming vehicle. Further, in a case where the oncoming vehicle is the automated drivable vehicle including the camera, the light source unit can be driven in the third mode to suppress halation caused in the camera of the oncoming vehicle.

In one or more of the embodiments described above, an example in which the lighting device 100 emits visible light is described, but the present invention is not limited thereto. Even when the lighting device is configured to emit infrared light or the like, according to the lighting device of one or more embodiments of the present invention, it is possible to suppress the occurrence of halation in the infrared camera of the oncoming vehicle.

In one or more of the embodiments described above, the lighting device mounted on the automated drivable vehicle which includes the camera is described, but the lighting device according to the present invention may be mounted on a vehicle which does not include a camera. Even in this case, the lighting device according to the present invention hardly causes halation in the camera of the oncoming vehicle.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A lighting device mounted on a vehicle and emitting light toward a front of the vehicle, the lighting device comprising:
    a light source unit capable of forming a light distribution pattern by emitting light toward a virtual region,
    wherein the virtual region expands in a rectangular shape at 15° to left and right and at 6° to upper and lower with respect to a reference line extending in a horizontal direction from a center position of the lighting device toward the front of the vehicle; and
    wherein the virtual region is equally divided into an upper portion, the first central portion, and a lower portion in an upper-lower direction and the virtual region is equally divided into a left portion, the second central portion, and a right portion in a left-right direction
    an illuminance controller capable of changing the illuminance of at least a part of the light distribution pattern, and
    an oncoming vehicle detector which transmits a signal according to the presence of an oncoming vehicle,
    wherein the illuminance controller lowers the illuminance of a region located in a first central portion and a second central portion according to the signal transmitted from the oncoming vehicle detector.

2. The lighting device according to claim 1, further comprising:
    a lamp chamber formed by a housing and an outer cover, and
    a camera disposed in the lamp chamber together with the light source unit,
    wherein the camera acquires information in front of the vehicle and transmits a signal according to the acquired information to the oncoming vehicle detector.

3. The lighting device according to claim 1, further comprising:
an optical axis changing mechanism which turns an optical axis of the light source unit in the left-right direction,
wherein in a turning on state of the lighting device,
when the signal transmitted from the oncoming vehicle detector when the presence of the oncoming vehicle is detected is not input to the illuminance controller, the optical axis of the light source unit extends toward a center in front of the vehicle, and the light source unit emits light to form a high beam light distribution pattern, and
when the signal transmitted from the oncoming vehicle detector when the presence of the oncoming vehicle is detected is input to the illuminance controller, the illuminance controller lowers the illuminance of the region located in the first central portion and the second central portion in the virtual region and raises the illuminance of at least one of a region located in the first central portion and the left portion and a region located in the first central portion and the right portion by deviating the optical axis of the light source unit to at least one of the left and the right, respectively.

4. The lighting device according to claim 1,
wherein the light source unit is configured to form a first light distribution pattern and a second light distribution pattern,
wherein in the first light distribution pattern, a point having highest illuminance in the virtual region is located in the second central portion in a left-right direction,
wherein in the second light distribution pattern, in the virtual region, two points in descending order of illuminance are deviated rightward and leftward from the reference line in the left-right direction, and are located in the first central portion in the upper-lower direction,
wherein in the turning on state of the lighting device,
when the signal transmitted from the oncoming vehicle detector when the presence of the oncoming vehicle is detected is not input to the illuminance controller, the illumination controller causes the light source unit to emit light so as to form the first light distribution pattern, and
when a signal transmitted from the oncoming vehicle detector which transmits the signal according to the presence of the oncoming vehicle is input, the illuminance controller causes the light source unit to emit light so as to form the second light distribution pattern.

5. The lighting device according to claim 4,
wherein in the second light distribution pattern, two points in descending order of illuminance are located in the left portion and the right portion of the virtual region in the left-right direction.

* * * * *